Oct. 18, 1966   H. BIEHL   3,279,433
APPARATUS FOR REARING PIGLETS
Filed July 29, 1964   3 Sheets-Sheet 1
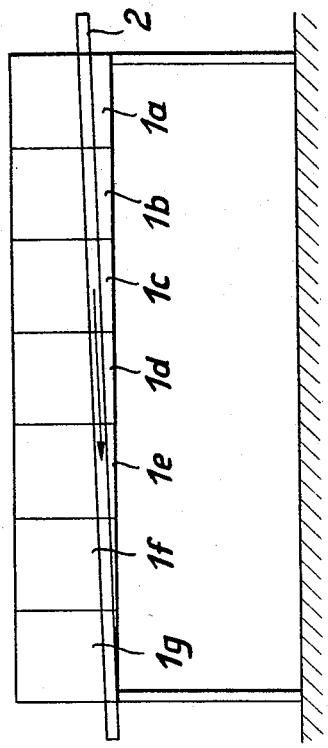
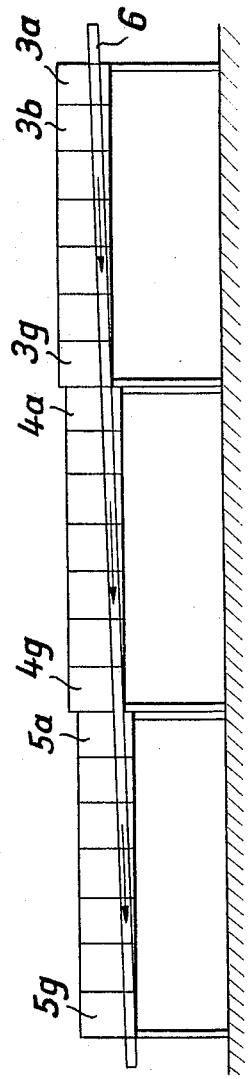

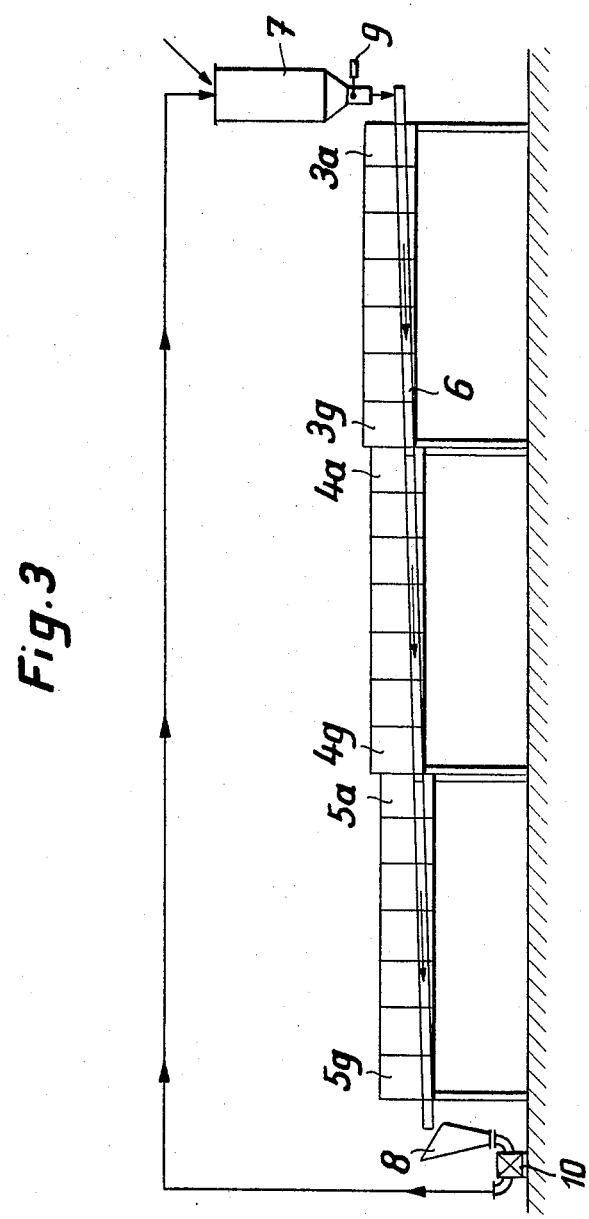

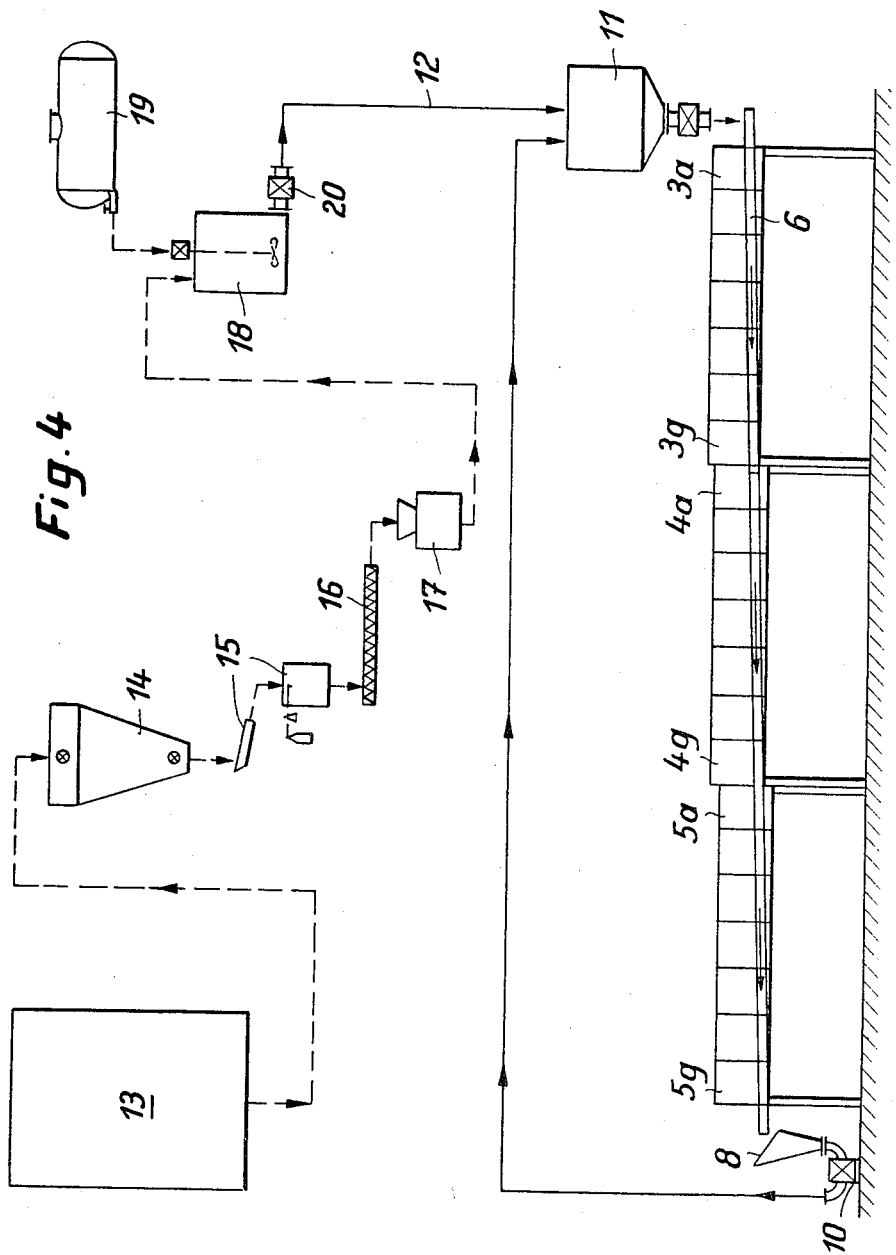

United States Patent Office 3,279,433
Patented Oct. 18, 1966

3,279,433
APPARATUS FOR REARING PIGLETS
Heinrich Biehl, Heinrichshof, near Trittau, Germany
Filed July 29, 1964, Ser. No. 384,971
2 Claims. (Cl. 119—51)

The present invention constitutes a further development and enhancement of the method protected in the U.S. patent application No. 340,008 to improve the rearing of piglets.

The method of the above mentioned patent application is characterized in that the piglets are weaned from the mother sow a few days after their birth and are kept in individual cages and fed separately until they have reached an age of several weeks, whereupon the raising and feeding of piglets in the usual manner is carried out.

If, in practicing the above method, the animals which are kept separate from one another, are given their feed in individual containers adapted to be pushed into the cage, this involves disadvantages, because it is either necessary to place a container into each individual cage at the appropriate feeding times which necessitates an expensive maintenance work, or the container must remain in the cage with a greater amount of feed therein for a longer period of time, which may lead to a contamination or, under certain circumstances, may spoil the feed and have an unfavourable influence on the well-being of the animals.

It has now been found that these disadvantages may be avoided and the issue of the suitable amounts of feed to the piglets kept separately be made in a simple and clean manner at the times required, in that these piglets are fed in a common feeding operation in such a manner that the usual feed such as milk, mash of coarse-ground cereals and the like, is poured into troughs arranged in the individual cages slightly inclined downwardly, from which troughs the feed flows due to its own gravity. In this arrangement it is possible without any difficulty to maintain exactly the appropriate ration for each animal which, as has been found, is of decisive importance for an optimum growth of the animals; for the period of time during which the feed is issued may be adapted to the natural conditions. It is no doubt possible to ensure by means of the degree of the slope of the trough that all the animals accommodated in one row in the cages and eating from one and the same trough have the feed available to them for the same period of time. The person carrying out the feeding operation may now exactly establish, for instance, whether it is to the purpose for him when feeding ten times a day, to extend his filling operation at the upper end of the trough so long that each animal has the feed available at its trough for 10, 15 or more seconds. It has been taught by experience that during the time the feed flowing along the trough is available to each individual animal to be taken by it the animal itself balances the difference in feed requirement in comparison with other animals which is necessitated either by difference in size or type, by either passiveness or increased activity, so that also animals of different ages and different breeds may be reared in common in one and the same installation.

A suitable system to carry out the method in accordance with the invention is characterized by individual adjacent cages displaced downwardly with respect to each other in a horizontal direction which cages are provided with a trough having a slope of about 3° to 10° with respect to the horizontal plane and designed preferably in the form of a semi-tubular channel arranged in each individual cage in such a manner that the rear or lower end of the trough of one cage joins the front or upper end of the adjacent trough and is closely connected to it. Such a system is furthermore characterized by first means to supply the feed at the beginning of the trough of the first cage in the line and by second means to intercept the feed at the end of the trough last in the said line. This system may service practically any number of cages one behind the other; the number being limited in the first line by the respective space conditions. Installations in which 28 to 35 individual cages are connected by one single trough line with the same number of piglets being simultaneously fed therein, have shown best results.

The filling of the feed supply may be effected from any one container by hand. The use of a mobile container, for instance a pumping container, has a work saving advantage. With such a pumping wagon to which a time switch may be fitted, a certain time interval may be preset for the flow of the milk, and it is possible to supply two trough lines simultaneously via a bifurcated hose system.

It is advantageous if a storage container is available which is provided with a supply line leading to the beginning of the trough and equipped with an automatic valve, as well as with a return line leading from the end of the trough to said storage container and which may have a feed pump arranged therein. During operation, milk, for instance, will be supplied into the trough at the highest point thereof about 10 to 12 times a day. The milk flows through the trough, the slope is effective in such a manner that the animal standing at the beginning and that one standing at the end of the trough may take milk for equally long times. Thus a rational feeding is effected by means of the period of time the flow of the milk lasts, which may also be adapted to a considerable degree to the natural feeding times without causing any major burdening with work (10 or 12 times a day) because of the simplicity of the method.

The installation in accordance with the invention works especially economically and in a manner to save labour if the storage container is directly connected with a feed preparing plant via at least one supply line. By this arrangement, a mechanization or even automation is made possible, in that, for instance, the charge of milk is regulated via a milk line by means of electrically operated valves through a timing arrangement and the milk flowing out at the end of the trough is returned into a return line via a pumping system.

In combination with the controllable milk supply system, the feed preparing plant may be built up in such a manner that consequently, in the end, an automatic feed preparation may be effected in that the feed provided for mixing is stored in a silo which is connected with a container arranged above a tilting scale. A refilling of the container is located above the tilting scale is arranged for via a filling level indicator. The tilting scale supplies the prescribed amount of feed into a homogenizer via a screw, for instance, into a colloid mill which, after completion of the homogenization, supplies the finished product into a container. Now, the circuit line may be supplied from this container by means of the pump. If a predetermined pressure has been reached, the electrically operated valves will be actuated. The flow of milk through the troughs is beginning. The duration thereof may be limited whereby the rationing possibility may be influenced in addition to what has been stated above.

Such a system in accordance with the invention makes it possible to feed some 1000 animals simultaneously with the feed being rationed without any essential human labour required. Emptying of the line is by air. The line used to supply the animals with milk may at the same time be used to supply the animals with drinking water. The water effects at the same time a cleaning of the installation. The practice of the invention is explained in more detail by way of example and with the aid of the attached drawings. In the drawings, FIG. 1 shows a perspective view of seven series-arranged individual cages with a continuous trough, FIG. 2 is a view of twenty-one individual cages arranged one behind the other and displaced from one another in a horizontal direction and with a continuous trough, FIG. 3 shows the arrangement of FIG. 2 with a storage container for the feed, and FIG. 4 shows the arrangement of FIG. 2 with a storage container, controllable milk supply system and feed preparation system.

FIG. 1 shows seven individual cages 1a, 1b . . . 1g in series arrangement on the same horizontal level with each other, and through these cages there is extending a trough 2 which is directed slightly obliquely downwardly, in which the feed charged thereon is flowing in the direction of the arrow by its own gravity. The amount of the rations for the animals present in the individual cages may be adjusted to the desired amounts in accordance with the natural conditions by means of the period of time the feed flows through the trough and the slope of the trough.

FIG. 2 shows an arrangement with an enlarged number of individual cages, namely three times seven cages 3a–g, 4a–g and 5a–g. In this arrangement, the cages 3a–g are arranged one behind the other and horizontally level with each other, however, slightly displaced horizontally with respect to the cages 4a–g which are likewise arranged one behind the other and horizontally level with each other, said latter group being in turn displaced horizontally with respect to the group of individual cages 5a–g likewise arranged one behind the other and horizontally level with each other. This arrangement makes it possible to supply all the 21 cages with one and the same trough line 6, the slope of which may be adjusted to be so low that when the feed flows in the direction of the arrow owing to its own weight, the feed movement is sufficiently slow to enable each animal in each individual cage to take a sufficient amount of feed.

Referring now to FIG. 3 in which like reference numerals are used for like parts as compared with FIG. 2, there is provided at the top end of the trough 6 a supply container 7 and a reception container 8 at the lower end of the trough 6 for non-consumed feed. The feed is charged onto the trough 6 via the charging device 9, and the feed not taken by the animals and flowing into the reception container 8 is returned from there into the storage container 7 in the direction of the arrows by means of a pumping device 10 via conduit lines.

In FIG. 4 there is provided, in addition to the circuit of the feed from a storage container 11 which is slightly modified in comparison with that one shown in FIG. 3, a trough 6 through the individual cages 3a–g, 4a–g, 5a–g which empties into the reception container 8 and from there the feed flows via the pump 10 back into the storage container, and an automatically operating feed preparation plant to prepare the feed supplied into the storage container 11 via a line 12 as fresh supply. This feed preparation plant consists of the silo 13, in which the feed intended for mixing is stored, a container 14 arranged above a tilting scale 15, a screw 16 through which the weighed amount of feed is supplied into a colloid mill 17, a container 18 equipped with a stirring device, in which the feed comminuted by the colloid mill and the liquid, for instance milk from a supply tank 19 may be joined and mixed. Finally, a pumping device 20 is provided which regulates the drain of the mixed feed into the line 12 and into the storage container 11. The lines and valves required (not shown) may be in the form of electrically operated valves and actuated from a central station at predetermined times, and a feeding of young animals may be made possible which practically corresponds with the natural feeding conditions.

What I claim is:
1. Apparatus for rearing piglets comprising, in combination,
 (a) a plurality of adjacently disposed cages each adapted to receive a piglet, said cages being arranged in a plurality of series disposed side by side, the cages of a common series being equally horizontally related, each series of cages being disposed vertically lower than the adjacent series of cages in a common side-by-side direction,
 (b) a common continuous feed trough having an unobstructed flow path extending through said series of cages, said trough having a first end and a second end said inclined with respect to the horizontal wherein said first end is vertically disposed higher than said second end, said feed trough being inclined to the horizontal in the range of approximately 3°–10°,
 (c) said first trough end extending from the highest series of cages and said second trough end extending from the lowest series of cages whereby liquid feed may be placed in said trough first end and flow under gravitational force through said trough and series of cages toward said trough second end whereby nonconsumed feed is discharged from said trough second end,
 (d) feed supply means having a feed outlet disposed adjacent and above said trough first end for selectively depositing feed on said trough first end,
 (e) feed receiving means disposed adjacent and below said trough second end including a receptacle adapted to receive nonconsumed feed from said trough second end,
 (f) a feed pump communicating with said receptacle having an outlet, and
 (g) a conduit communicating with said pump outlet and said feed supply means returning nonconsumed feed from said receptacle and pump to said feed supply means.
2. Apparatus for rearing piglets as in claim 1:
 (a) a comminuted feed supply means having an outlet,
 (b) liquid feed supply means having an outlet,
 (c) a mixing chamber having an inlet communicating with said comminuted feed supply means outlet and said liquid feed supply means outlet, and an outlet communicating with said feed supply means disposed adjacent said trough first end whereby mixed comminuted and liquid feed are supplied to said feed supply means.

References Cited by the Examiner

UNITED STATES PATENTS

| | | | |
|---|---|---|---|
| 2,706,966 | 4/1955 | Cline | 119—74 |
| 2,929,356 | 3/1960 | Bacigalupo | 119—51 |
| 3,159,139 | 12/1964 | Haggard et al. | 119—17 |

SAMUEL KOREN, *Primary Examiner.*

HUGH R. CHAMBLEE, *Assistant Examiner.*